(12) United States Patent
Hunt (10) Patent No.: US 7,299,245 B2
(45) Date of Patent: Nov. 20, 2007

(54) DETERMINING SIMILARITY OF RECIPES

(75) Inventor: Timothy D. Hunt, Seattle, WA (US)

(73) Assignee: Allrecipes.com, Seattle, WA (US)

( * ) Notice: Subject to any disclaimer, the term of this patent is extended or adjusted under 35 U.S.C. 154(b) by 398 days.

(21) Appl. No.: 10/759,701

(22) Filed: Jan. 18, 2004

(65) Prior Publication Data

US 2005/0160114 A1 Jul. 21, 2005

(51) Int. Cl.
*G06F 7/00* (2006.01)
*G06F 17/30* (2006.01)
(52) U.S. Cl. .................................. 707/104.1; 707/3
(58) Field of Classification Search .................. 705/1; 703/3; 707/100, 104.1
See application file for complete search history.

(56) References Cited

U.S. PATENT DOCUMENTS 5,960,440 A * 9/1999 Brenner et al. .......... 707/104.1
6,993,532 B1 * 1/2006 Platt et al. .................. 707/102

* cited by examiner

*Primary Examiner*—Sam Rimell
*Assistant Examiner*—Alicia M Lewis
(74) *Attorney, Agent, or Firm*—Law Offices of Michael Dryja (57) ABSTRACT

Determining similarity among recipes is disclosed. A computer-implemented method of one embodiment of the invention receives a first recipe. The method determines one or more second recipes that are similar to the first recipe, and then outputs the one or more second recipes. The second recipes may be determined as being similar to the first recipe based on one or more different factors in one embodiment. Such factors may include: a weighted ingredient coefficient; a weighted same-type coefficient taking into account whether recipes are of the same type; a weighted same-title words coefficient taking into account the extent to which non-common title words of one recipe are also within the titles of other recipes; a weighted shared-keywords coefficient taking into account shared keywords among recipes; and, a weighted shared-ingredients coefficient taking into account the extent to which ingredients are shared among recipes.

18 Claims, 6 Drawing Sheets

422 — DETERMINE WEIGHTED SAME-TYPE COEFFICIENT FOR THIRD RECIPE AS NON-ZERO WHERE THE FIRST RECIPE AND THE THIRD RECIPE ARE OF THE SAME TYPE, AND AS ZERO WHERE THE FIRST RECIPE AND THE THIRD RECIPE ARE NOT OF THE SAME TYPE

424 — UTILIZE WEIGHTED SAME-TYPE COEFFICIENT AS A FACTOR UPON WHICH BASIS THE SECOND RECIPES THAT ARE SIMILAR TO THE FIRST RECIPE ARE DETERMINED AS ONE OR MORE OF THE THIRD RECIPES

442 — DETERMINE WEIGHTED SAME-TITLE WORDS COEFFICIENT FOR THIRD RECIPE AS PERCENTAGE OF NON-COMMON WORDS OF THE FIRST RECIPE THAT ARE WITHIN TITLE OF THE THIRD RECIPE, MULTIPLIED BY A WEIGHT

444 — UTILIZE WEIGHTED SAME-TITLE WORDS COEFFICIENT AS A FACTOR UPON WHICH BASIS THE SECOND RECIPES THAT ARE SIMILAR TO THE FIRST RECIPE ARE DETERMINED AS ONE OR MORE OF THE THIRD RECIPES

462 — DETERMINE WEIGHTED SHARED-KEYWORDS COEFFICIENT FOR THIRD RECIPE AS PERCENTAGE OF KEYWORDS OF FIRST RECIPE THAT ARE ALSO KEYWORDS OF THIRD RECIPE DIVIDED BY THE TOTAL NUMBER OF UNIQUE KEYWORDS BETWEEN THE FIRST RECIPE AND THE THIRD RECIPE, MULTIPLIED BY A WEIGHT

464 — UTILIZE WEIGHTED SHARED-KEYWORDS COEFFICIENT AS A FACTOR UPON WHICH BASIS THE SECOND RECIPES THAT ARE SIMILAR TO THE FIRST RECIPE ARE DETEMRINED AS ONE OR MORE OF THE THIRD RECIPES

482 — DETERMINE WEIGHTED SHARED-INGREDIENTS COEFFICIENT FOR THIRD RECIPE AS PERCENTAGE OF NUMBER OF INGREDIENTS OF FIRST RECIPE THAT ARE ALSO INGREDIENTS OF THIRD RECIPE PLUS NUMBER OF INGREDIENTS OF THIRD RECIPE THAT ARE ALSO INGREDIENTS OF FIRST RECIPE, DIVIDED BY THE TOTAL NUMBER OF INGREDENTS IN THE FIRST AND THE THIRD RECIPES, MULTIPLIED BY A WEIGHT

484 — UTILIZE WEIGHTED SHARED-KEYWORDS COEFFICIENT AS A FACTOR UPON WHICH BASIS THE SECOND RECIPES THAT ARE SIMILAR TO THE FIRST RECIPE ARE DETERMINED AS ONE ORE MORE OF THE THIRD RECIPES

480

DETERMINING SIMILARITY OF RECIPES

BACKGROUND OF THE INVENTION

A recipe can generally be defined as a list of ingredients and a set of directions for making or preparing some type of food. Recipes are commonly used by both amateur and expert cooks and other types of food preparers to make or prepare items or types of food. Historically, recipes were gathered together in cookbooks, which are books of collections of different recipes. Alternatively, many cooks and food preparers keep recipes on cards, either professionally or manually prepared, and organize the cards in recipe boxes or holders.

With the increasing popularity of computer technology, however, recipes are now frequently maintained in computerized form. Originally, recipes were maintained only in special recipe-oriented computer programs, or general-purpose database or spreadsheet computer programs. These programs may allow users to add their own recipes for storage on the computer, and/or may come with a large number of predefined recipes, thus supplanting traditional cookbooks. The programs may be run on single computers, or may be run over a network. For example, the recipes themselves may be stored on one computer, or on a network-attached storage (NAS) device, and be accessed by other computers on the network.

More recently, recipe storage and access over the Internet has become popular. There are a number of world-wide web (WWW) sites that cater to recipes. A user accesses such web sites using a web browser program on his or her computer or other type of computing device, and thus accesses the recipes through the web sites. The recipes themselves are stored on a server computer or other type of computing device at a remote location hosted by the organization that owns the web site, or which is associated with the web site owner. Having recipes accessible over the Internet enables a large number of users to access the recipes stored on recipe-oriented web sites simultaneously, and can also allow users to more easily share recipes with other like-minded users.

SUMMARY OF THE INVENTION

The invention relates to determining similarity among recipes. A computer-implemented method of one embodiment of the invention receives a first recipe. The method determines one or more second recipes that are similar to the first recipe, and then outputs the one or more second recipes. The second recipes may be determined as being similar to the first recipe based on one or more different factors in one embodiment. Such factors may include a: a weighted ingredient coefficient taking into account sums of differences between relative contributions of individual ingredients among recipes; and, a weighted same-type coefficient taking into account whether recipes are of the same type. Other factors may include: a weighted same-title words coefficient taking into account the extent to which non-common title words of one recipe are also within the titles of other recipes; a weighted shared-keywords coefficient taking into account shared keywords among recipes; and, a weighted shared-ingredients coefficient taking into account the extent to which ingredients are shared among recipes.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1A:
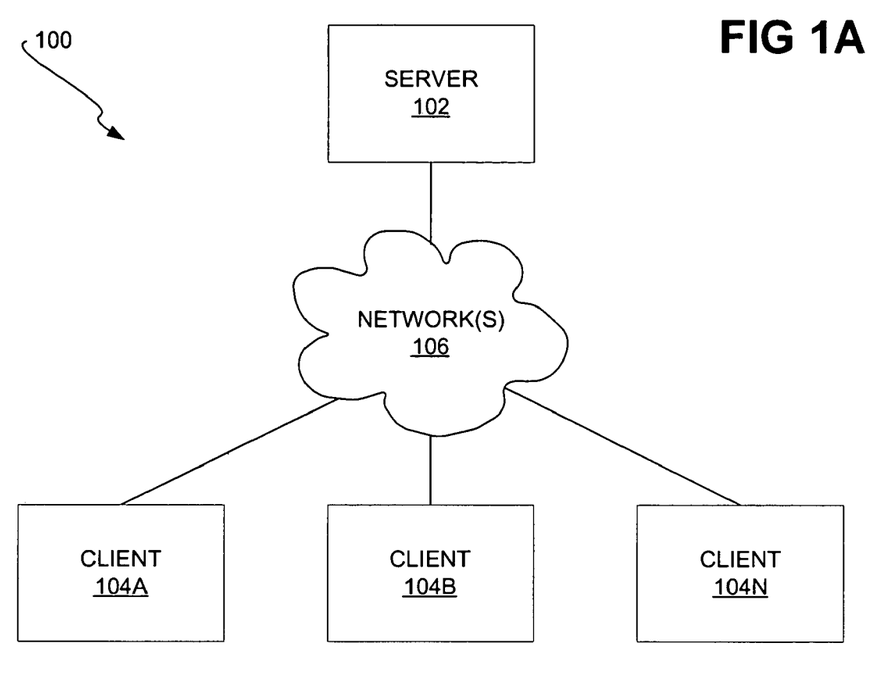
FIGS. 1A and 1B are diagrams of a representative system and a representative computing device, in conjunction with which embodiments of the invention may be practiced.

FIG. 1A shows a representative system 100, in accordance with which embodiments of the invention may be practiced. The system 100 includes a server 102 communicatively coupled to clients 104A, 104B, . . . , 104N, collectively referred to as the clients 104, over one or more networks 106. The server 102 and each of the clients 104 may be a computing device, and may be inclusive of network-attached storage (NAS) devices and other types of peripheral devices. Although only one server 102 is specifically depicted in FIG. 1A, there may be more than one server within the system 100 as well. The networks 106 may be or include the Internet, intranets, extranets, Ethernet networks, wired and wireless networks, and/or wired and/or mobile telecommunication networks, as can be appreciated by those of ordinary skill within the art. Other types of networks may include peer-to-peer networks, where the server 102 is not present, for instance.

In one embodiment, the server 102 runs web server software, and each of the clients 104 runs web-browsing software. The web server software may provide for a recipe-oriented web site, which is accessible by the clients 104 over the networks 106 via the web-browsing software running on the clients 104. Therefore, recipes may be stored on the server 102, and accessible by and displayed at the clients 104. In other embodiments of the invention, recipe-oriented software, or more general-purpose software that is able to maintain recipes, may be specifically run at each of the clients 104, where the clients 104 may or may not be stand-alone devices not communicatively connected to networks such as the networks 106. In such an embodiment, the recipes are stored on the clients 104 themselves. General-purpose software that is able to maintain recipes may include database programs, spreadsheet programs, and word processing programs, among other types of computer programs.

Figure 1B:
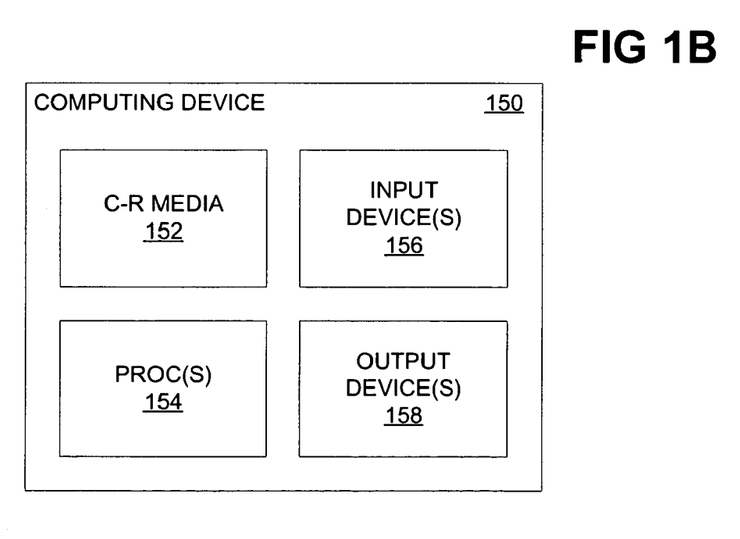

FIG. 1B shows a representative computing device 150, in accordance with which embodiments of the invention may be practiced. For example, the computing device 150 may implement any of the server 102 and the clients 104 of FIG. 1A. The computing device 150 is depicted in FIG. 1B as including computer-readable media 152, one or more processors 154, one or more input devices 156, and one or more output devices 158. However, as can be appreciated by those of ordinary skill within the art, the computing device 150 may include components, mechanisms, and/or peripherals in addition to and/or in lieu of those depicted in FIG. 1B. The device 150 may be and/or include a laptop computer, a desktop computer, a handheld computer, a personal-digital assistant (PDA) device, a mobile phone device, and/or another type of computing device.

The computer-readable media 152 may include fixed and/or removable media, volatile and/or non-volatile media, and/or semiconductor, magnetic, and/or optical media, as well as other types of media. The media 152 may in one embodiment include fixed semiconductor volatile media, such as dynamic random-access memory (DRAM), from which computer programs, such as web-browsing programs, are run. The media 152 may in one embodiment include fixed magnetic non-volatile media, such as a hard disk drive, where such computer programs, and where data for the computer programs, are permanently stored. The media 152 may further include in one embodiment removable magnetic non-volatile media, such as floppy disks insertable into floppy disk drives of the device 150, as well as removable optical non-volatile media, such as optical discs insertable into optical disk drives of the computing device 150.

The processors 154 of the computing device 150 may specifically run the computer programs permanently stored on non-volatile of the computer-readable media 152, from volatile of the media 152. The input devices 156 allow users to interact with the computing device 150, and may include keyboards, buttons, pointing devices such as mice and touch pads, as well as other types of input devices. The output devices 158 allow users to view output from the device 150, and may include display devices, such as liquid-crystal displays (LCD's), flat-panel displays (FPD's), cathode-ray tube (CRT) display devices, plasma displays, as well as other types of display devices. The output devices 158 may further include image-formation devices, such as laser and inkjet printing devices, as well as other types of image-formation devices.

Figure 2:
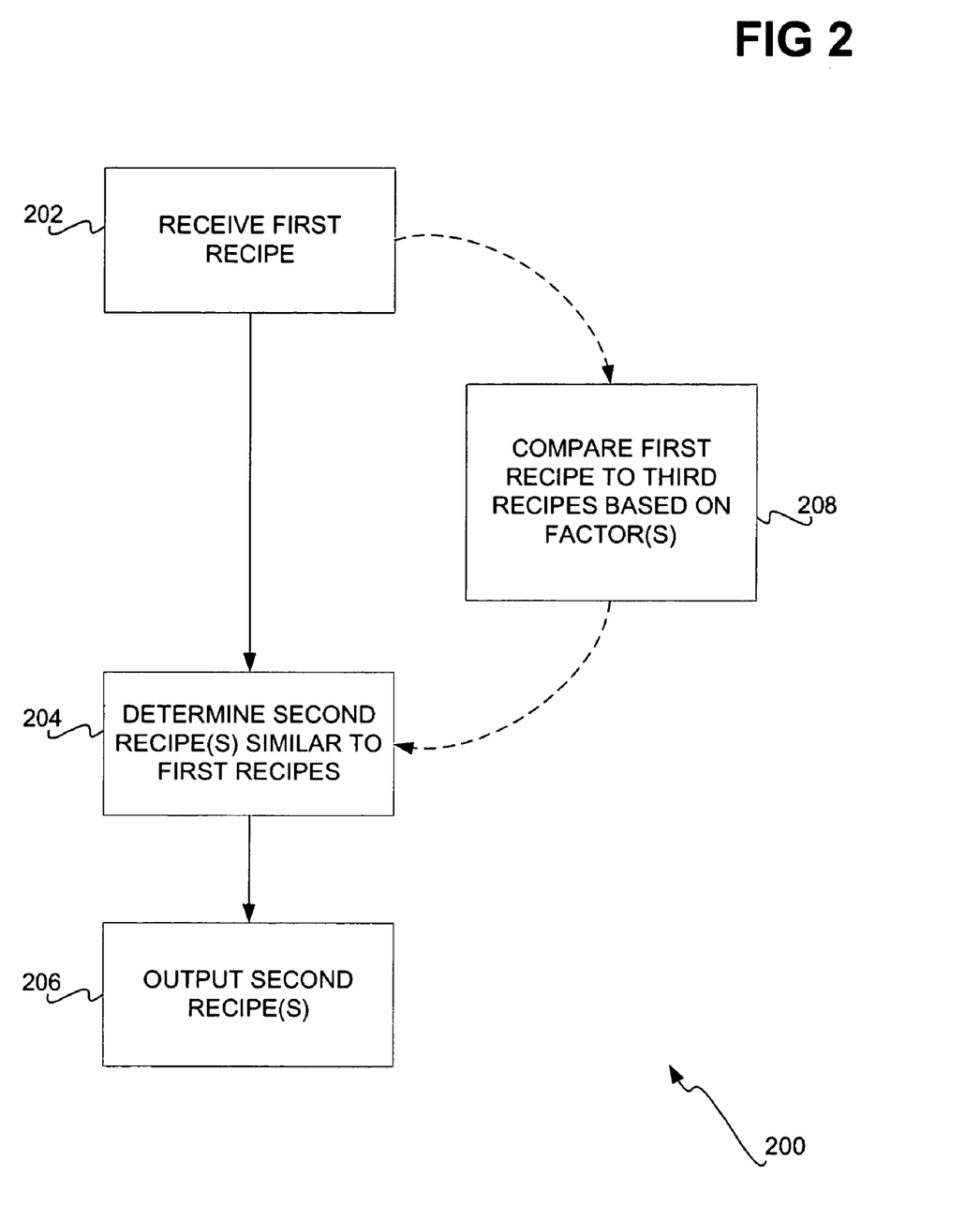
FIG. 2 is a flowchart of a method, according to an embodiment of the invention.

FIG. 2 shows a method 200, according to an embodiment of the invention. FIG. 2 is intended as an overview, and more specific embodiments of the invention that are consistent with but more detailed than the method 200 are described in succeeding sections of the detailed description. A first recipe is received (202). For instance, the server 102 of FIG. 1A may have conveyed the identities of a number of recipes to one of the clients 104 of FIG. 1A, on which the user thereof has selected one of these recipes as the first recipe. As another example, a recipe-oriented computer program, or a general-purpose program capable of maintaining recipes, may be running on one of the clients 104, and may display to the user a number of recipes from which the user selects one recipe as the first recipe. Like other methods of embodiments of the invention, the method 200 may be implemented as means within a computer-readable medium of an article of manufacture.

Next, the method 200 determines one or more second recipes that are similar to the first recipes (204). As used herein, the term similar may generally in one embodiment be defined as: resembling in many respects; somewhat like; having a general likeness; related in appearance or nature; alike though not identical; resembling; and/or, having the same or some of the same characteristics. The manner by which second recipes that are similar to the first recipes are specifically determined in specific embodiments of the invention is described in succeeding sections of the detailed description. The determination of the second recipes may be accomplished by the server 102 of FIG. 1A in one embodiment, or by one of the clients 104 of FIG. 1A in another embodiment. These second recipes are then output (206). For example, they may be displayed to the user on a display device, or may be printed by the user on an image-formation device, such as an inkjet or a laser printer. It is noted that the nomenclature used herein of first recipe, second recipes, and third recipes is meant only to easily differentiate and demarcate the identities of the different recipes, and does not imply anything further, such as a specific ordering of the recipes, and so on.

In one embodiment, to determine the second recipes that are similar to the first recipes, the first recipe is compared to a number of third recipes based on one or more factors (208). The third recipes that are most similar to the first recipe are then denoted as, or selected as, the second recipes in 204 of FIG. 2, and output in 206 of FIG. 2. Such factors may include, but are not limited to: a weighted ingredient coefficient; a weighted same-type coefficient taking into account whether recipes are of the same type; and, a weighted same-title words coefficient taking into account the extent to which non-common title words of one recipe are also within the titles of other recipes. Such factors may further include, but are not limited to: a weighted shared-keywords coefficient taking into account shared keywords among recipes; and, a weighted shared-ingredients coefficient taking into account the extent to which ingredients are shared among recipes.

Detailed Method

Figure 3:
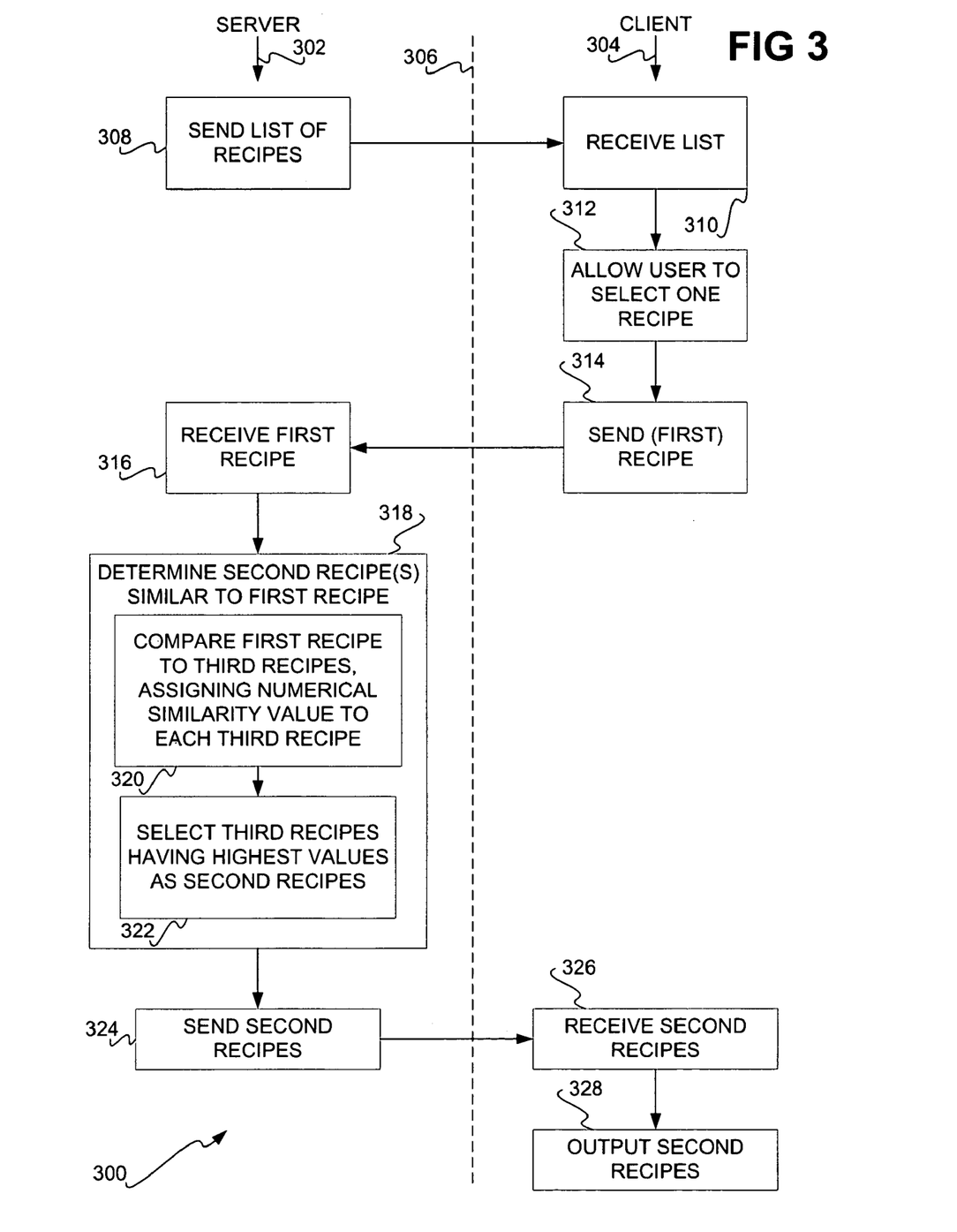
FIG. 3 is a flowchart of a method for determining similarity among recipes that is consistent with, but more detailed than, the method of FIG. 2, according to an embodiment of the invention.

FIG. 3 shows a method 300 that is more detailed than, but consistent with, the method 200 of FIG. 2, according to an embodiment of the invention. The method 300 is specifically described in relation to a server communicating with a client, such as the server 102 communicating with one of the clients 104 over the networks 106 of FIG. 1A. However, at least some parts of the method 300 are applicable to recipe-oriented software, or general-purpose software that is capable of maintaining recipes, running completely on one of the clients 104, which may or may not be connected to the networks 106. In FIG. 3, parts of the method 300 that are performed at or by the server are indicated within the column 302, whereas parts of the method 300 that are performed at or by the client are indicated within the column 304. A dotted line 306 separates the columns 302 and 304, indicating that communication between the server and the client is taking place, such as over one or more of the networks 106. The method 300 may be performed in conjunction with or as part of a web-browsing session by a web-browsing program running on the client, of a web site hosted by the server.

The server sends a list of recipes to the client (308), and the client receives this list of recipes from the server (310).

For example, the user at the client may have requested that the server send all the recipes that are stored on the server that relate to chocolate cake. There may be a dozen such recipes, the list of which is sent to the client. The client allows the user to select one of the recipes, as the first recipe that the user wishes to find or learn of similar or comparable recipes (312). The client sends the identity of this first recipe to the server (314), which receives the identity of the first recipe from the client (316).

Next, the server determines the identities of one or more second recipes that are similar to the first recipe (318). This can include comparing the first recipe to each of a number of third recipes based on one or more factors, and assigning a numerical similarity value to each third recipe (320). For instance, the server may have stored thereat ten thousand or more recipes, and thus compares the first recipe to each of these third recipes based on one or more factors, assigning a numerical similarity value to each third recipe. The numerical similarity value of a third recipe indicates how similar it is to the first recipe. In one embodiment, the higher the numerical similarity value of a given third recipe, the more similar it is to the first recipe.

Determining the identities of the second recipes can further include selecting the third recipes that have the highest numerical similarity values as the second recipes (322). For instance, a predetermined or dynamic or variable number, such as twenty, ten, fifty, and so on, of the third recipes having the highest numerical similarity values may be selected as the second recipes. As another example, the third recipes having numerical similarity values greater than a predetermined threshold may be selected as the second recipes. Other approaches to determine which of the third recipes are selected as the second recipes most similar to the first recipe may also be employed.

The server then sends identities of the second recipes to the client (324), and the client receives the identities of the second recipes from the server (326). The client finally outputs the identities of the second recipes for user viewing (328). The identities of the second recipes may only include the names of the recipes, such that the user may further have to select a given second recipe to learn the details of the recipe, including its ingredient list and set of directions for making the desired food item from the ingredients within the ingredient list. Alternatively, the identities of the second recipes may include some or all of the ingredients, and/or some or all of the directions, of the second recipes. Where just some of the ingredients and/or some of the directions of the second recipes are output, the user may further have to select a given second recipe to learn the complete details of the recipe.

Factors to Determine Similarity Among Recipes

As has been noted, in at least some embodiments of the invention, one or more factors can be used to compare the first recipe to the third recipes to select second recipes from the third recipes, as the recipes that are similar to the first recipe. Such factors have been delineated as potentially including: a weighted ingredient coefficient; a weighted same-type coefficient taking into account whether recipes are of the same type; and, a weighted same-title words coefficient taking into account the extent to which non-common title words of one recipe are also within the titles of other recipes. Such factors have been delineated as also potentially including: a weighted shared-keywords coefficient taking into account shared keywords among recipes; and, a weighted shared-ingredients coefficient taking into account the extent to which ingredients are shared among recipes. The manner by which each of these factors may be employed to assess the similarity of a given third recipe with the first recipe is now described in detail.

For illustrative and descriptive clarity, an example first recipe and an example third recipe are provided, in relation to which the description of each of the factors of the preceding paragraph is made. It is noted that these example recipes are provided solely for illustrative and descriptive clarity, and do not represent limitations of embodiments of the invention. That is, other types of recipes may, can, and are used in conjunction with embodiments of the invention.

The first recipe may be for "decadent and rich chocolate cookies," and may be of the type or category "cookies," and may have the keywords "chocolate" and "cookies." The recipe may have the following list of ingredients: three cups plain flour; one cup sugar; one-half cup cocoa; and, one-half cup butter. The third recipe to which the first recipe is to be compared, so that a numerical similarity value is assigned to the third value that indicates how similar it is to the first recipe, may be for "grandma's oatmeal cookies." This third recipe may also be of the type or category "cookies," but may have the keywords "oatmeal" and "cookies," and may have the following list of ingredients: two cups plain flour; one cup sugar; one cup rolled oats (oatmeal); and, one-half cup butter.

Furthermore, the following cup-to-gram (weight) conversions are noted: one cup plain flour is approximately 125 grams; one cup sugar is approximately 250 grams; one cup cocoa is approximately 110 grams; one-cup butter is approximately 250 grams; and, one cup oatmeal is approximately 90 grams. Therefore, the first recipe for "decadent and rich chocolate cookies" may have its ingredients also specified as follows: 375 grams plain flour; 250 grams sugar; 55 grams cocoa; and, 125 grams butter. Similarly, the second recipe for "grandma's oatmeal cookies" may have its ingredients also specified as: 250 grams plain flour; 250 grams sugar; 90 grams oatmeal; and, 125 grams butter.

Figure 4A:
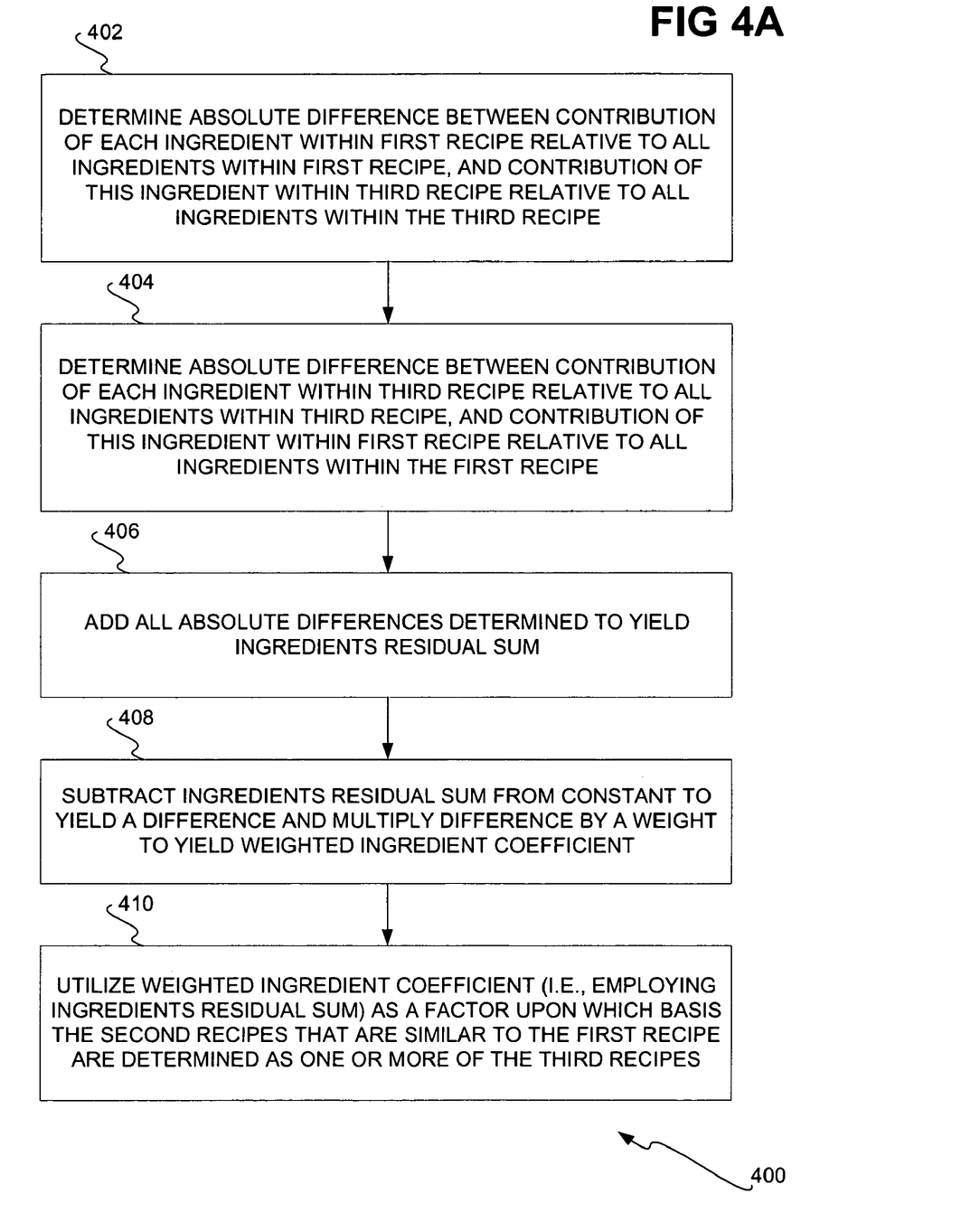
FIGS. 4A, 4B, 4C, 4D, and 4E are flowcharts of methods of how different factors can be employed in the methods of FIGS. 2 and 3, according to varying embodiments of the invention.

FIG. 4A shows a method 400 for using a weighted ingredient coefficient taking into account sums of absolute differences between relative contributions of individual ingredients among recipes to determine those of the third recipes that are selected as the second recipes similar to the first recipe, according to an embodiment of the invention. The method 400 is performed for each third recipe. The result of the method 400 is a weighted ingredient coefficient that may act as a factor added with other coefficients acting as factors to yield the numerical similarity value for a third recipe.

First, the absolute difference between the contribution of each ingredient within the first recipe relative to all the ingredients within the first recipe, and the contribution of this ingredient within the third recipe relative to all ingredients within the third recipe, is determined (402). With respect to the example first recipe, there are four ingredients: 375 grams plain flour; 250 grams sugar; 55 grams cocoa, and 125 grams butter. The total gram weight of all four ingredients of the example first recipe is thus 375+250+55+125=805 grams. With respect to the example third recipe, there are also four ingredients: 250 grams plain flour; 250 grams sugar; 90 grams oatmeal; and, 125 grams butter. The total gram weight of these ingredients in the example third recipe is thus 250+250+90+125=715 grams.

The relative contribution of the plain flour to the four ingredients of the example first recipe within the example first recipe is 375/805=47%; the relative contribution of the plain flour to the four ingredients of the example third recipe is 250/715=35%. The absolute difference between these relative contributions is thus 12%. The relative contribution of the sugar to all the four ingredients of the example first recipe within the example first recipe is 250/805=31%; the relative contribution of the sugar to the four ingredients of the example third recipe is 250/715=35%. The absolute difference between these relative contributions is 4%. The relative contribution of the butter to all the four ingredients of the example first recipe within the example first recipe is 125/805=16%; the relative contribution of the butter to the four ingredients of the example third recipe is 125/705=17%. The absolute difference between these relative contributions is 1%.

Finally, the relative contribution of the cocoa to the four ingredients of the example first recipe within the example first recipe is 55/805=7%, whereas because there is no cocoa within the example third recipe, the relative contribution of cocoa relative to the ingredients of the example third recipe is 0%. The absolute difference between these relative contributions is 7%. It is noted that to determine all of these relative contributions, the gram weights of the ingredients have been employed. In other embodiments of the invention, units of volume, or other units of weight, may instead be used.

Next, the absolute difference between the contribution of each ingredient within the third recipe relative to all the ingredients within the third recipe, and the contribution of this ingredient within the first recipe relative to all ingredients within the first recipe, is determined (404). With respect to the example third recipe, there are four ingredients: 250 grams plain flour; 250 grams sugar; 90 grams oatmeal; and, 125 grams butter. The total gram weight of all four ingredients of the example third recipe is thus 250+250+90+125=715 grams, as before. With respect to the example first recipe, the four ingredients of the first recipe are: 375 grams plain flour; 250 grams sugar; 55 grams coca; and, 125 grams butter. The total gram weight of these three ingredients in the example first recipe is thus: 375+250+55+125=805 grams, also as before.

The relative contribution of the plain flour to the four ingredients of the example third recipe within the example third recipe is 250/715=35%, and the relative contribution of the plain flour to the four ingredients of the example first recipe is 375/805=47%, for an absolute difference of 12%. The relative contribution of the sugar to the four ingredients of the example third recipe within the example third recipe is 250/715=35%, and the relative contribution of the sugar to the four ingredients of the example first recipe is 250/805=31%. This yields an absolute difference of 4%.

Furthermore, the relative contribution of the butter to the four ingredients of the example third recipe within the example third recipe is 125/715=17%, and the relative contribution of the butter to the four ingredients of the example first recipe is 125/805=16%, for an absolute difference of 1%. The relative contribution of the oatmeal to the four ingredients of the example third recipe within the example third recipe is 90/715=13%. Because there is no oatmeal in the example first recipe, its relative contribution to the ingredients of the example first recipe is 0%, yielding an absolute difference of 13%.

The absolute differences that have been determined are added together to yield an ingredients residual sum (406). That is, the absolute differences determined in 402 are added together, the absolute differences determined in 404 are added together, and the two resulting sums are added together to yield the ingredients residual sum. In the case of the example first recipe and the example third recipe the sum of the absolute differences determined in 402 are: 12% (plain flour)+4% (sugar)+1% (butter)+7% (cocoa)=24%. In the case of the example first recipe and the example third recipe the sum of the absolute differences determined in 404 are: 12% (plain flour)+4% (sugar)+1% (butter)+13% (oatmeal)=30%. Adding the two sums together yields 24%+30%=54, where the percentage is dropped.

The ingredients residual sum is then subtracted from a constant, such as 200 in one embodiment, to yield a difference, which is then multiplied by a weight to yield the weighted ingredient coefficient for the third recipe in question relative to the first recipe (408). In the case of the example first recipe and the example third recipe, subtracting the ingredients residual sum of 54 from the example constant 200 yields 146. This difference of 137 is then multiplied by a weight, such as 0.25 in one embodiment, to yield the weighted ingredient coefficient of 34 for the example third recipe relative to the example first recipe. The weighted ingredient coefficient may also be referred to as a weighted ingredient quantity coefficient in one embodiment of the invention.

The weighted ingredient coefficient, which implicitly employs the ingredients residual sum determined in 406, can therefore be utilized as a factor upon which basis the second recipes that are similar to the first recipe are determined as one or more of the third recipes (410). For instance, the weighted ingredient coefficient may be added to other coefficients or factors that are determined, and the resulting numerical similarity value compared to the numerical similarity values of other third recipes to determine whether the third recipe in question should be selected as one of the second recipes. A third recipe may be selected as one of the second recipes similar to the first recipe where its numerical similarity value is one of the highest predetermined number of numerical similarity values that have been determined for all the third recipes. A third recipe may also be selected as one of the second recipes similar to the first recipe where its numerical similarity value is greater than a predetermined threshold.

Figure 4B:
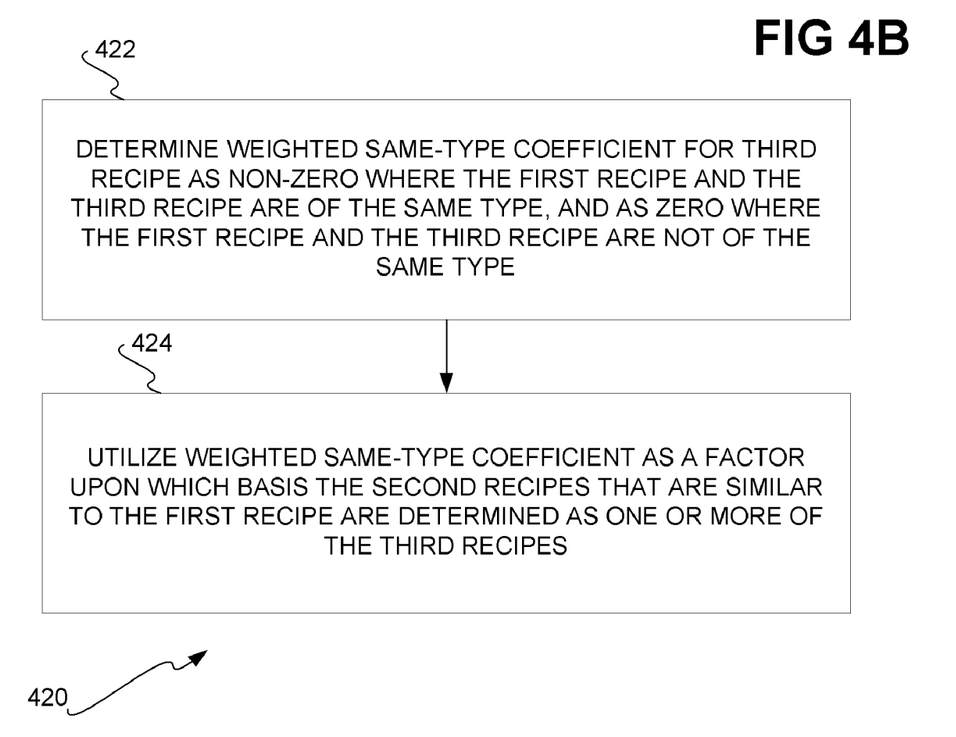

FIG. 4B shows a method 420 for using a weighted same-type coefficient taking into account whether the first recipe and the third recipes are of the same type, according to an embodiment of the invention. The method 420 is performed for each third recipe. The result of the method 420 is a weighted same-type coefficient that may act as a factor added with other coefficients acting as factors to yield the numerical similarity value for a third recipe.

The weighted same-type coefficient for the third recipe is determined as non-zero where the first recipe and the third recipe are of the same type, and as zero where the first recipe and the third recipe are not of the same type (422). The non-zero value may be 100% multiplied by a predetermined weight, such as 0.5 in one embodiment, to yield the non-zero value of 50, where the percentage is dropped. In the case of the example first recipe and the example third recipe, both recipes have the same type or category, "cookies," such that the weighted same-type coefficient for the example third recipe is non-zero, such as 50.

The weighted same-type coefficient determined in 422 can therefore be utilized as a factor upon which basis the second recipes that are similar to the first recipe are determined as one or more of the third recipes (424). For example, the weighted same-type coefficient may be added to other coefficients, such as the weighted ingredient coefficient, and the resulting numerical similarity value compared to the numerical similarity values of other third recipes to determine if the third recipe in question should be selected as one of the second recipes. In the case of the example first recipe and the example third recipe, the weighted ingredient coefficient of 34 may be added to the weighted same-type coefficient of 50 to yield a numerical similarity value of 84, where no other coefficients are considered when determining the numerical similarity value.

Figure 4C:
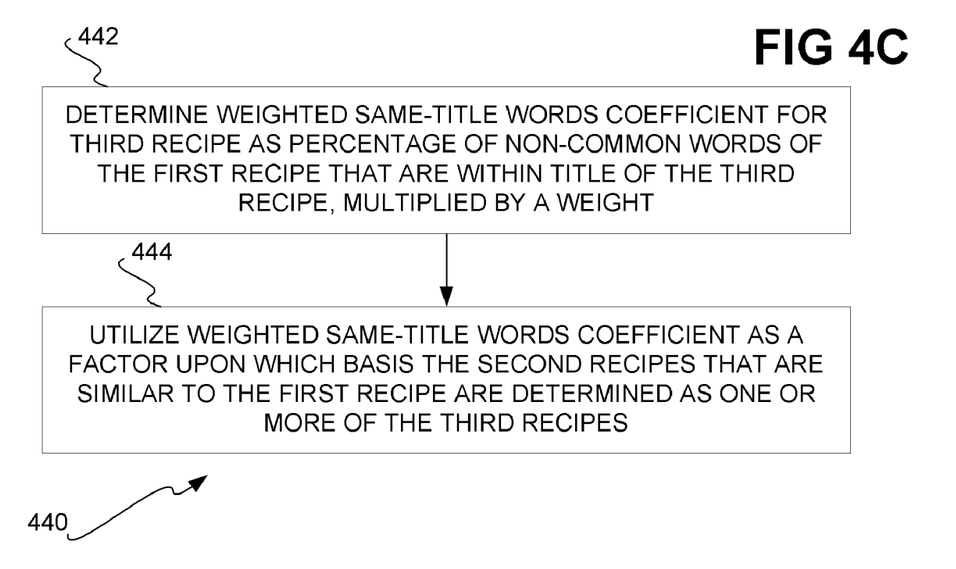

FIG. 4C shows a method 440 for using a weighted same-title words coefficient taking into account the extent to which non-common title words of the first recipe are also within the titles of the third recipes, according to an embodiment of the invention. The method 440 is performed for each third recipe. The result of the method 440 is a weighted same-title words coefficient that may act as a factor added with other coefficients acting as factors to yield the numerical similarity value for a third recipe.

The weighted same-title words coefficient is determined as the percentage of non-common title words of the first recipe that are within the title of the third recipe, and multiplied by a predetermined weight (442). Non-common title words may be generally defined in one embodiment as descriptive nouns and adjectives. That is, common title words may include: prepositions, such as "of," "with," "for," and "within"; articles, such as "a," "an," and "the"; and, conjunctions, such as "and" and "or." Common title words may also include size-, portion-, or value-related adjectives, such as "large," "big," "miniature," "good," and so on. However, the definition of what is a common title word and what is a non-common title word may vary in accordance with different embodiments of the invention. For example, other common word matching techniques, such as stemming, as known to those of ordinary skill within the art, may be employed.

In the case of the example first recipe and the example third recipe, there are five title words within the example first recipe: "decadent," "and," "rich," "chocolate," and "cookies." Of these, in one embodiment only the word "and" is considered a common title word, although in other embodiments, the word "decadent" and/or "rich" may also be considered a common title word. Therefore, there are four non-common title words within the example first recipe: "decadent," "rich," "chocolate," and "cookies." Of these four words, one word—"cookies"—is also found in the title of the example third recipe, which is "grandma's oatmeal cookies." Therefore, one out of four, or 25%, of the non-common title words of the example first recipe are also found within the title of the example third recipe. The predetermined weight may in one embodiment be 1.5, which multiplied by 25% yields the weighted same-title words coefficient of 38, where the percentage is dropped.

The weighted same-title words coefficient determined in 442 can therefore be utilized as a factor upon which basis the second recipes that are similar to the first recipe are determined as one or more of the third recipes (444). For example, the weighted same-title words coefficient may be added to other coefficients, such as the weighted ingredient coefficient and the weighted same-type coefficient, and the resulting numerical similarity value compared to the numerical similarity values of other third recipes to determine if the third recipe in question should be selected as one of the second recipes. In the case of the example first recipe and the example third recipe, the weighted same-title words coefficient of 38 may be added to the weighted ingredient coefficient of 34 and to the weighted same-type coefficient of 50 to yield a numerical similarity value of 122, where no other coefficients are considered when determining this value.

Figure 4D:
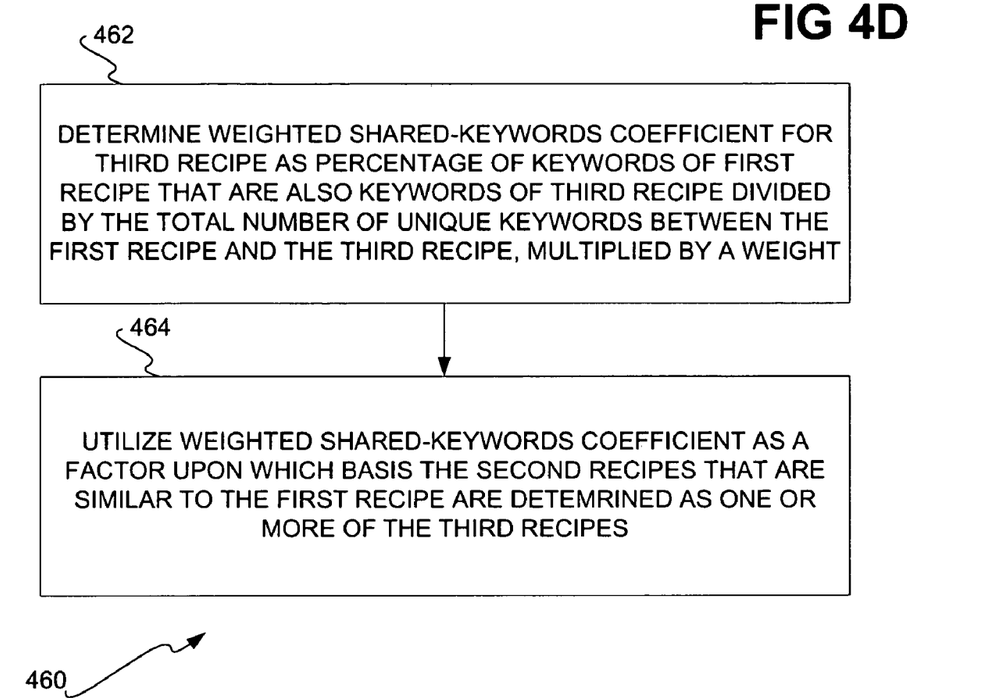

FIG. 4D shows a method 460 for using a weighted shared-keywords coefficient taking into account a number of shared keywords between the first recipe and the third recipes, according to an embodiment of the invention. The method 460 is performed for each third recipe. The result of the method 460 is a weighted shared-keywords coefficient that may act as a factor added with other coefficients acting as factors to yield the numerical similarity value for a third recipe.

The weighted shared-keywords coefficient is determined as the percentage of keywords shared between the first and the third recipes, divided by the total number of unique keywords between the first and the third recipes, and multiplied by a predetermined weight (462). Keywords may generally be defined in one embodiment as words that are descriptive of recipes, even where such words are not necessarily within the titles of the recipes and which may— but not necessarily—especially be used when searching for the recipes via user-entered queries, that is, as words used for finding recipes. For instance, the recipe "American hamburger" may have keywords like "American food," "grilled," and "meat." The recipe "macadamia nut delight" may have keywords like "nuts," "cookies," and so on. The types of keywords employed may vary in accordance with different embodiments of the invention.

In the case of the example first recipe and the example third recipe, there are two keywords for the example first recipe: "chocolate" and "cookies," and there are two keywords for the example third recipe: "oatmeal" and "cookies." There is thus one shared keyword between the two recipes, "cookies," and three total unique keywords between the two recipes: "chocolate," "cookies," and "oatmeal." Therefore, the weighted shared-keywords coefficient is one divided by three, or 33%, times a predetermined weight, which may in one embodiment be 1.5, to yield 50, where the percentage is dropped.

The weighted shared-keywords coefficient determined in 462 can therefore be utilized as a factor upon which basis the second recipes that are similar to the first recipe are determined as one or more of the third recipes (464). For example, the weighted shared-keywords coefficient may be added to other coefficients, such as the weighted ingredient coefficient, the weighted same-type coefficient, and the weighted same-title words coefficient, and the resulting numerical similarity value compared to the numerical similarity values of other third recipes to determine if the third recipe in question should be selected as one of the second recipes. In the case of the example first recipe and the example third recipe, the weighted shared-keywords coefficient of 50 may be added to the weighted ingredient coefficient of 34, the weighted same-type coefficient of 50, and the weighted same-title words coefficient of 38 to yield a numerical similarity value of 172, where no other coefficients are considered when determining this value.

Figure 4E:
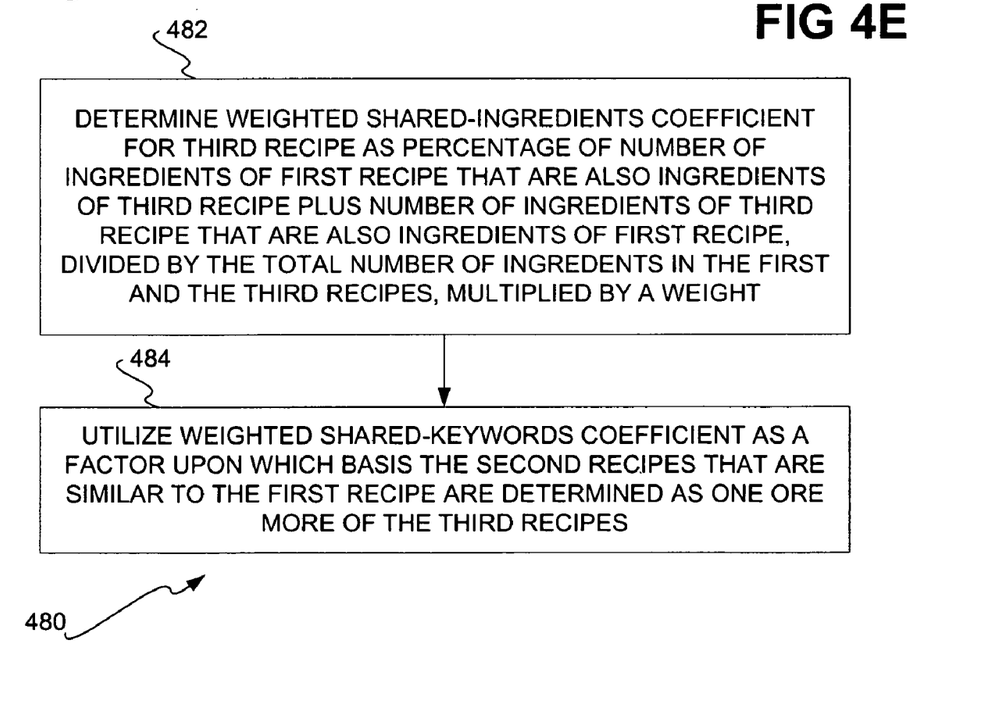

FIG. 4E shows a method 480 for using a weighted shared-ingredients coefficient taking into account the extent to which ingredients of the first recipe are also used within the third recipes and the extent to which ingredients of the third recipes are also used within the first recipe, according to an embodiment of the invention. The method 480 is performed for each third recipe. The result of the method 480 is a weighted shared-ingredients coefficient that may act as a factor added with other coefficients acting as factors to yield the numerical similarity value for a third recipe.

The weighted shared-ingredients coefficient is determined as the percentage of the number of the ingredients of the first recipe that are also ingredients of the third recipe plus the number of the ingredients of the third recipe that are also ingredients of the first recipe, divided by the total number of ingredients between the first and the third recipes, and multiplied by a predetermined weight (482). In the case of the example first recipe and the example third recipe, the example first recipe has four ingredients: plain flour, sugar, cocoa, and butter. Of these ingredients, the example third recipe also uses plain flour, sugar and butter. Furthermore, the example third recipe has four ingredients: plain flour, sugar, oatmeal, and butter. Of these ingredients, the example first recipe also uses plain flour, sugar, and butter. Therefore, the weighted shared-ingredients coefficient is three ingredients of the first recipe also shared with the third recipe plus three ingredients of the third recipe also shared with the first recipe, divided by eight total ingredients between the first and the third recipes, to yield 6/8=75%, times a predetermined weight. The predetermined weight may in one embodiment be 0.5, which multiplied by 75% yields the weighted shared-ingredients coefficient of 38, where the percentage is dropped.

The weighted shared-ingredients coefficient determined in 482 can therefore be utilized as a factor upon which basis the second recipes that are similar to the first recipe are determined as one or more of the third recipes (484). For example, the weighted shared-ingredients coefficient may be added to other coefficients, such as the ingredient coefficient, the weighted same-type coefficient, the weighted same-title words coefficient, and the weighted shared-keywords coefficient. The resulting numerical similarity value may then be compared to the numerical similarity values of other third recipes to determine if the third recipe in question should be selected as one of the second recipes. In the case of the example first recipe and the example third recipe, the weighted shared-ingredients coefficient of 38 may be added to the weighted ingredient (quantity) coefficient of 34, the weighted same-type coefficient of 50, the weighted same-title words coefficient of 38, and the weighted shared-keywords coefficient of 50 to yield a numerical similarity value of 210, where no other coefficients are considered.

In the embodiment of the invention using the five coefficients as have been described as factors for determining whether a given third recipe should be selected as a second recipe similar to the first recipe, the range of numerical similarity values is between 0 and 450, where the various constants and predetermined weights are also as have been described. This is because the weighted ingredient (quantity) coefficient may range from 0 to 50, the weighted same-type coefficient may range from 0 to 50, and the weighted same-title words coefficient may range from 0 to 150. Furthermore, the weighted shared-keywords coefficient may range from 0 to 150, whereas the weighted shared-ingredients coefficient may range from 0 to 50. For a completely dissimilar recipe, the values for these coefficients will be zero, yielding a numerical similarity value of zero. For a completely identical recipe, the values for these coefficients will be at their maximum values, yielding a numerical similarity value of 450.

Thus, in one embodiment, where the example third recipe has one of a highest number of numerical similarity values as compared to other third recipes that may be considered relative to the example first recipe, the example third recipe may be denoted as a second recipe similar to the first recipe. In another embodiment, third recipes having a threshold of greater than 60% similarity to the example first recipe may be denoted as second recipes similar to the example first recipe. This threshold corresponds to a numerical similarity value of 270. Therefore, because the example third recipe has a numerical similarity value of 210 compared to the example first recipe, it may be not denoted as a second recipe similar to the example first recipe.

ALTERNATIVE EMBODIMENTS AND CONCLUSION

The invention has been described in relation to five coefficients that may be used as factors for determining whether a given recipe should be selected as similar to another given recipe. Any or all of these coefficients may be used as factors, as well as additional factors, such as additional coefficients, in addition to and/or in lieu of the factors that have been described. Other such factors and/or coefficients may include cooking style, cooking technique, dish type, complexity, difficulty in preparation, cooking and/or preparation time, nutritional content, geographic recipe source, recipe age, and/or recipe author, among other factors and/or coefficients. Furthermore, the various weights that have been described may vary in other embodiments of the invention, and may be dynamically or statically predetermined.

It is therefore noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

What is claimed is:

1. A computer-implemented method comprising:
   receiving a first recipe;
   determining one or more second recipes that are similar to the first recipe based one or more factors, including a weighted ingredient coefficient taking into account sums of differences between relative contributions of individual ingredients between the first recipe and each second recipe and between each second recipe and the first recipe; and,
   outputting the one or more second recipes by one or more of:
      displaying the one or more second recipes to a user on a display device: and,
      printing the one or more second recipes by a user using an image-formation device,
   wherein the weighted ingredient coefficient as to the first recipe and a particular second recipe is defined as and determined as a first constant from which a second constant multiplied by the sums of differences between the relative contributions of the individual ingredients between the first recipe and the particular second recipe and between the particular second recipe and the first recipe is subtracted,
   wherein the greater the weighted ingredient coefficient as to the first recipe and the particular second recipe is, the more similar the particular second recipe is to the first recipe.

2. The method of claim 1, wherein determining the one or more second recipes that are similar to the first recipe based at least on the weighted ingredient coefficient comprises:
   for each of a plurality of third recipes,
      for each of one or more ingredients within the first recipe, determining a first difference between a contribution of the ingredient within the first recipe relative to all the ingredients within the first recipe and a contribution of the ingredient within the third recipe relative to all the ingredients within the third recipe;

for each of one or more ingredients within the third recipe, determining a second difference between a contribution of the ingredient within the third recipe relative to all the ingredients within the third recipe and a contribution of the ingredient within the first recipe relative to all the ingredients within the third recipe that are also in the first recipe;

adding the first difference for each ingredient within the first recipe to the second difference for each ingredient within the third recipe to yield an ingredient residuals sum for the third recipe; and, using the ingredient residuals sum as a factor upon which basis the one or more second recipes that are similar to the first recipe are determined as one or more of the plurality of third recipes.

3. The method of claim 2, wherein the first difference is an absolute difference and the second difference is an absolute difference.

4. The method of claim 2, wherein determining the one or more second recipes that are similar to the first recipe based at least on the weighted ingredient coefficient further comprises, for each third recipe, subtracting the ingredient residuals sum from a constant to yield a difference, and multiplying the difference by a weight to yield the weighted ingredient coefficient upon which basis the one or more second recipes that are similar to the first recipe are determined as the one or more of the plurality of third recipes.

5. The method of claim 1, wherein determining the one or more second recipes that are similar to the first recipe based on the one or more factors comprises determining the one or more second recipes that are similar to the first recipe based at least on a weighted same-type coefficient taking into account whether the first recipe and each second recipe are of a same type, wherein the weighted same-type coefficient as to the first recipe and the particular second recipe is defined as and determined as a value that is non-zero where the first recipe and the particular second recipe are of the same type and otherwise as zero, wherein the greater the weighted same-type coefficient as to the first recipe and the particular second recipe is, the more similar the particular second recipe is to the first recipe.

6. The method of claim 5, wherein determining the one or more second recipes that are similar to the first recipe based at least on the weighted same-type coefficient comprises:

for each of a plurality of third recipes, determining the weighted same-type coefficient for each third recipe as non-zero where the first recipe and the third recipe are of the same type and as zero where the first recipe and the third recipe are not of the same type; and, utilizing the weighted same-type coefficient as a factor upon which basis the one or more second recipes that are similar to the first recipe are determined as one or more of the plurality of third recipes.

7. The method of claim 1, wherein determining the one or more second recipes that are similar to the first recipe based on the one or more factors comprises determining the one or more second recipes that are similar to the first recipe based at least on a weighted same-title words coefficient taking into account an extent to which non-common title words of the first recipe are also within a title of each second recipe, wherein the weighted same-title words coefficient as to the first recipe and the particular second recipe is defined as and determined as a third constant multiplied by a percentage of the non-common title words of the first recipe that are also within the title of the particular second recipe, wherein the greater the weighted same-title words coefficient as to the first recipe and the particular second recipe is, the more similar the particular second recipe is to the first recipe.

8. The method of claim 7, wherein determining the one or more second recipes that are similar to the first recipe based at least on the weighted same-title words coefficient comprises:

for each of a plurality of third recipes, determining the weighted same-title words coefficient as a percentage of the non-common title words of the first recipe that are within the title of the third recipe, multiplied by a weight; and, utilizing the weighted same-title words coefficient as a factor upon which basis the one or more second recipes that are similar to the first recipe are determined as one or more of the plurality of third recipes.

9. The method of claim 1, wherein determining the one or more second recipes that are similar to the first recipe based on the one or more factors comprises determining the one or more second recipes that are similar to the first recipe based at least on a weighted shared-keywords coefficient taking into account a number of shared keywords between the first recipe and each second recipe, wherein the weighted shared-keywords coefficient as to the first recipe and the particular second recipe is defined as and determined as a third constant multiplied by a percentage of the shared keywords between the first and the particular second recipes to a total number of unique keywords between the first and the particular second recipes, wherein the greater the weighted shared-keywords coefficient as to the first recipe and the particular second recipe is, the more similar the particular second recipe is to the first recipe.

10. The method of claim 9, wherein determining the one or more second recipes that are similar to the first recipe based at least on the weighted shared-keywords coefficient comprises:

for each of a plurality of third recipes, determining the weighted shared-keywords coefficient as a percentage of keywords of the first recipe that are also keywords of the third recipe divided by a total number of unique keywords between the first recipe and the third recipe, multiplied by a weight; and, using the weighted shared-keywords coefficient as a factor upon which basis the one or more second recipes that are similar to the first recipe are determined as one or more of the plurality of third recipes.

11. The method of claim 1, wherein determining the one or more second recipes that are similar to the first recipe based on the one or more factors comprises determining the one or more second recipes that are similar to the first recipe based at least on a weighted shared-ingredients coefficient taking into account an extent to which ingredients of the first recipe are also used within each second recipe and an extent to which ingredients of each second recipe are also used within the first recipe, wherein the weighted shared-ingredients coefficient as to the first recipe and the particular second recipe is defined and determined as a third constant multiplied by a percentage of a number of the ingredients of the first recipe that are also within the particular second recipe plus a number of the ingredients of the particular second recipe that are also within the first recipe to a total number of ingredients between the first recipe and the particular second recipe, wherein the greater the weighted shared-ingredients coefficient as to the first recipe and the particular second recipe is, the more similar the particular second recipe is to the first recipe.

12. The method of claim 11, wherein determining the one or more second recipes that are similar to the first recipe based on at least the weighted shared-ingredients coefficient comprises:

for each of a plurality of third recipes, determining the weighted shared-ingredients coefficient as a percentage of a number of the ingredients of the first recipe that are also ingredients of the third recipe plus a number of the ingredients of the third recipe that are also ingredients of the first recipe, divided by a total number of ingredients between the first recipe and the third recipe, multiplied by a weight; and, utilizing the weighted shared-ingredients coefficient as a factor upon which basis the one or more second recipes that are similar to the first recipe are determined as one or more of the plurality of third recipes.

13. The method of claim 1, wherein determining the one or more second recipes that are similar to the first recipe comprises determining a numerical similarity value between the first recipe and each of a plurality of third recipes and denoting a number of the plurality of third recipes having highest numerical similarity values as the second recipes.

14. The method of claim 1, wherein determining the one or more second recipes that are similar to the first recipe comprises determining a numerical similarity value between the first recipe and each of a plurality of third recipes and denoting each third recipe having a numerical similarity value greater than a threshold as one of the second recipes.

15. A computer-implemented method comprising:

receiving a first recipe;

determining one or more second recipes that are similar to the first recipe by comparing the first recipe to a plurality of third recipes based on one or more factors such that each third recipe is assigned a numerical similarity value indicating similarity to the first recipe; and, outputting the one or more second recipes as one or more of the plurality of third recipes having highest numerical similarity values, by one or more of displaying the one or more second recipes to a user on a display device; and, printing the one or more second recipes by a user using an image-formation device, wherein at least one of the factors are selected from the group of factors comprising:

a weighted ingredient coefficient taking into account sums of differences between relative contributions of individual ingredients between the first recipe and each third recipe and between each third recipe and the first recipe, the weighted ingredient coefficient as to the first recipe and a particular third recipe defined as and determined as a first constant from which a second constant multiplied by the sums of differences between the relative contributions of the individual ingredients between the first recipe and the particular third recipe and between the particular third recipe and the first recipe is subtracted, such that the greater the weighted ingredient coefficient as to the first recipe and the particular third recipe is, the more similar the particular third recipe is to the first recipe;

a weighted same-title words coefficient taking into account an extent to which non-common title words of the first recipe are also within a title of each third recipe, the weighted same-title words coefficient as to the first recipe and the particular third recipe defined as and determined as a third constant multiplied by a percentage of the non-common title words of the first recipe that are also within the title of the particular third recipe, such that the greater the weighted same-title words coefficient as to the first recipe and the particular third recipe is, the more similar the particular third recipe is to the first recipe;

a weighted shared-keywords coefficient taking into account a number of shared keywords between the first recipe and each second recipe, the weighted shared-keywords coefficient as to the first recipe and the particular third recipe defined as and determined as a fourth constant multiplied by a percentage of the shared keywords between the first and the particular third recipes to a total number of unique keywords between the first and the particular third recipes, such that the greater the weighted shared-keywords coefficient as to the first recipe and the particular third recipe is, the more similar the particular third recipe is to the first recipe; and, a weighted shared-ingredients coefficient taking into account an extent to which ingredients of the first recipe are also used within each second recipe and the extent to which ingredients of each second recipe are also used within the first recipe, the weighted shared-ingredients coefficient as to the first recipe and the particular third recipe defined and determined as a fifth constant multiplied by a percentage of a number of the ingredients of the first recipe that are also within the particular third recipe plus a number of the ingredients of the particular third recipe that are also within the first recipe to a total number of ingredients between the first recipe and the particular third recipe, such that the greater the weighted shared-ingredients coefficient as to the first recipe and the particular third recipe is, the more similar the particular third recipe is to the first recipe.

16. The method of claim 15, wherein the numerical similarity value of each third recipe is determined by summing together the group of factors for the third recipe, such that outputting the one or more second recipes as the one or more of the plurality of third recipes having the highest numerical similarity values comprises outputting the one or more second recipes as a number of the one or more of the plurality of third recipes having the highest numerical similarity values.

17. The method of claim 15, wherein the numerical similarity value of each third recipe is determined by summing together the group of factors for the third recipe, such that outputting the one or more second recipes as the one or more of the plurality of third recipes having the highest numerical similarity values comprises outputting the one or more second recipes having numerical similarity values greater than a threshold.

18. An article of manufacture comprising:

a computer-readable medium; and, means in the medium for determining for a first recipe one or more second recipes that are similar to the first recipe by comparing the first recipe to a plurality of third recipes based at least on a weighted ingredient coefficient taking into account sums of differences between relative contributions of individual ingredients between the first recipe and each third recipe and between each third recipe and the first recipe, wherein the weighted ingredient coefficient as to the first recipe and a particular third recipe is defined as and determined as a first constant from which a second constant multiplied by the sums of differences between the relative contributions of the individual ingredients between the first recipe and the particular third recipe and between the particular third recipe and the first recipe is subtracted, wherein the greater the weighted ingredient coefficient as to the first recipe and the particular third recipe is, the more similar the particular third recipe is to the first recipe, wherein the means is further for one or more of:

displaying the one or more second recipes to a user on a display device; and, printing the one or more second recipes by a user using an image-formation device.

* * * * *